United States Patent [19]
Morikawa et al.

[11] Patent Number: 5,370,484
[45] Date of Patent: Dec. 6, 1994

[54] PUSH RIVET HAVING UNFASTENING MEANS

[75] Inventors: Hiroshi Morikawa; Hisashi Kubogouchi, both of Kanagawa, Japan

[73] Assignee: Nifco, Inc., Kanagawa, Japan

[21] Appl. No.: 145,356

[22] Filed: Oct. 29, 1993

[30] Foreign Application Priority Data

Oct. 29, 1992 [JP] Japan .............................. 4-080935[U]

[51] Int. Cl.⁵ .............................................. F16B 13/06
[52] U.S. Cl. ......................................... 411/48; 411/41; 411/60
[58] Field of Search ................. 411/41, 45, 46, 48, 411/60, 62

[56] References Cited

U.S. PATENT DOCUMENTS

| | | | |
|---|---|---|---|
| 4,927,287 | 5/1990 | Ohkawa et al. | 411/41 X |
| 4,952,106 | 8/1990 | Kubogoshi et al. | 411/48 |
| 5,085,545 | 2/1992 | Takahashi | 411/48 X |
| 5,201,623 | 4/1993 | Benedetti et al. | 411/41 X |
| 5,211,519 | 5/1993 | Saito | 411/48 X |

FOREIGN PATENT DOCUMENTS

| | | | |
|---|---|---|---|
| 1-165810 | 11/1989 | Japan | F16B 19/10 |
| 1122512 | 8/1968 | United Kingdom | 411/41 |

*Primary Examiner*—Neill R. Wilson
*Attorney, Agent, or Firm*—Skjerven, Morrill, MacPherson, Franklin, & Friel

[57] ABSTRACT

In a push rivet consisting of a grommet part and a pin part so that two panel members may be joined together first by passing the grommet part through an opening passed through these panel members, and forcing the pin part into a central bore of the grommet part to radially expand the free end of the grommet part, because the head of the pin part is provided with an outer profile which conforms to an outer profile of a part of the flange surrounding the pin head when the pin part is completely forced into the central bore, the fastener presents a smooth appearance which is pleasing to the eyes, and the pin part is prevented from being inadvertently pulled out of the grommet part even when an external object is struck against the pin head. However, a gap is defined between the pin head and the surrounding part of the grommet part so that the push rivet can be readily unfastened by fitting a pointed end of a tool into the gap, and pulling the pin part out of the central bore by using the tool as a lever.

5 Claims, 15 Drawing Sheets

Fig. 15

PUSH RIVET HAVING UNFASTENING MEANS

TECHNICAL FIELD

The present invention relates to a fastener, and in particular to a two-piece fastener called push rivet consisting of a grommet part adapted to be fitted into an hole, and a pin part adapted to be driven into a central longitudinal bore of the grommet part to complete the fastening process.

BACKGROUND OF THE INVENTION

Conventionally, when mounting various automotive component parts on a panel member of an automobile, push rivets are extensively used. A push rivet consists of two parts. The first part consists of a grommet part including a leg portion adapted to be passed into a mounting hole of a panel member and a flange integrally provided at its upper end, with a central longitudinal bore passed entirely through the grommet part. The second part consists of a pin part including a pin head, and a pin shank depending therefrom. The pin shank includes a part having an outer diameter greater than the inner diameter of the central bore of the leg portion of the grommet part. As a result, when the leg portion of the grommet part is passed into a mounting hole of a panel member, and the shank of the pin part is forced into the central bore of the grommet part, the leg portion of the grommet part is forced to expand radially, and becomes tightly and securely engaged with the mounting hole.

Japanese utility model laid-open (kokai) publication No. 1-165810 discloses a push rivet which can be easily unfastened when necessary. This push rivet includes a cam structure which causes the pin part to recede out of the grommet part and the leg portion to be radially contracted when the head of the pin part is turned by using a suitable tool such as a screwdriver so that the push rivet may be unfastened without damaging it, and it may be used again.

However, according to this proposal, when an attempt is made to turn the head with the intention to dislodge the pin part, the grommet part tends to turn with the pin part, thereby preventing the receding movement of the pin part. It is therefore often necessary to secure the grommet part before turning the head and unfasten the push rivet. It is highly inconvenient to say the least, and sometimes impractical because the push rivet may not be located in a readily accessible part. Furthermore, depending on the location of the push rivet, even engaging a tool with the head of the pin part may cause a great difficulty, let alone turning it.

BRIEF SUMMARY OF THE INVENTION

In view of such problems of the prior art, a primary object of the present invention is to provide a push rivet which can be readily unfastened when necessary.

A second object of the present invention is to provide a push rivet which allows it to be unfastened even when the head of its pin part is located in a poorly accessible part.

These and other objects of the present invention can be accomplished by providing a push rivet consisting of a grommet part, and a pin part; the grommet part including a hollow leg portion defining an axial central bore, the hollow leg portion being flexible so as to be elastically expanded radially, and a flange extending radially from an upper end of the leg portion, a central recess communicating with the central bore being defined on an upper end of the flange; the pin part including a pin shank adapted to be passed into the central bore, and an enlarged pin head formed at a base end of the pin shank, the pin shank being provided with engagement means at a free end thereof adapted to cooperate with an associated free end of the leg portion of the grommet part to expand the free end of the leg portion of the grommet part as the pin shank is forced into the central bore: the pin head being provided with an outer profile which conforms to an outer profile of a part of the flange surrounding the pin head when the pin part is completely forced into the central bore; a gap being defined between an outer periphery of the pin head and an associated inner periphery of the central recess for allowing a tip of a tool to be fitted into the gap.

Thus, according to the present invention, the pin shank is provided with engagement means at a free end thereof adapted to cooperate with an associated free end of the leg portion of the grommet part to expand the free end of the leg portion of the grommet part as the pin shank is forced into the central bore, and the push rivet can be fastened simply by pushing the pin head into the central recess of the grommet part. Because the pin head is provided with an outer profile which conforms to an outer profile of a part of the flange surrounding the pin head when the pin part is completely forced into the central bore, the fastener presents a smooth appearance which is pleasing to the eyes. Furthermore, even when an external object is struck against the pin head, the pin part is prevented from being inadvertently pulled out of the grommet part.

Still, when necessary, the push rivet can be readily unfastened by fitting a pointed end of a tool into the gap, and pulling the pin part out of the central bore by using the tool as a lever.

The gap may be defined in a number of ways. For instance, the pin head may be provided with an outer diameter substantially smaller than an inner diameter of the central recess so that the gap is defined as an annular gap defined therebetween. According to a preferred embodiment of the present invention, the central recess consists of a circular recess coaxial with the leg portion, and the pin head has a circular outer periphery which is coaxial with the circular recess.

According to another embodiment of the present invention, the pin head is provided with a notch on an outer periphery thereof so that the gap is defined between the notch and an associated part of the inner periphery of the central recess. Alternatively, the central recess may be provided with a notch on the inner periphery thereof so that the gap is defined between the notch and an associated part of the outer periphery of the pin head.

BRIEF DESCRIPTION OF THE DRAWINGS

Now the present invention is described in the following with reference to the appended drawings, in which.

DETAILED DESCRIPTION OF THE PREFERRED EMBODIMENTS

FIGS. 1 through 13 show a first embodiment of the push rivet according to the present invention. This push rivet consists of a grommet part 1 and a pin part 2.

Referring to FIGS. 4 through 7, the grommet part 1 comprises a circular radial flange 11, and a leg portion 14 coaxially depending therefrom. The upper end of the flange 11 is provided with a circular central recess 12 in a coaxial relationship, and a central bore 13 coaxially extends from this recess 12 all the way through the leg portion 14. Four ramps 15 each provided with a circumferentially sloping surface 15a are arranged around the central bore 13 on the bottom surface of the recess 12 at equal intervals.

Four slits 17 are cut radially across the leg portion 14 at equal intervals along its circumference, and each extend from a point adjacent to the flange 11 to the lower end of the leg portion 14, thus dividing the leg portion 14 into four equal segments 18 having a suitable flexibility. Each of the leg portion segments 18 is integrally provided with an engagement projection 19 on the inner surface of the lower end portion thereof. The outer surface of the lower end portion of each of the leg portion segments 18 is provided with a tapered portion 14a to facilitate the insertion of the grommet part 1 into a mounting hole.

Figure 10:
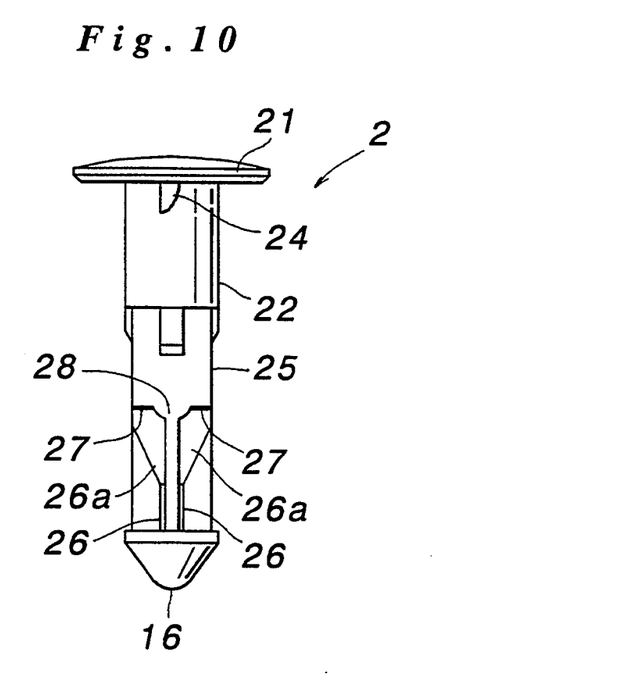
FIG. 10 is a side view of the pin part.

Referring to FIGS. 8 through 11, the pin part 2 comprises a circular head 21 having an outer diameter slightly smaller than the inner diameter of the central recess 12 of the grommet part 1, and a shank 22 depending integrally and coaxially from the head 21. The upper end of the head 21 is centrally provided with a cross-shaped recess 23 adapted to be engaged by a screwdriver or the like, and the lower surface of the head 21 is provided with a pair of axial projections 24 in diametrically opposing positions. The lower end of each of the axial projections 24 may be sloped along the circumferential direction as best illustrated in FIG. 10.

Figure 11:
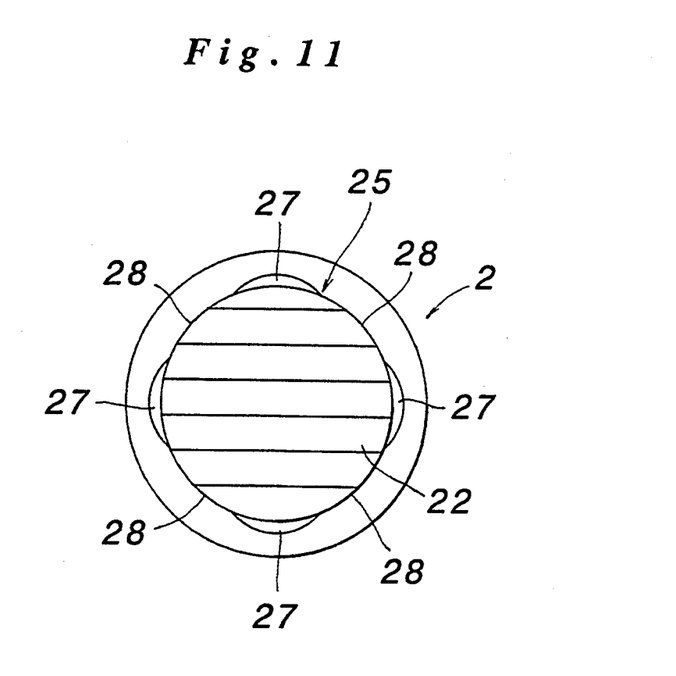
FIG. 11 is a sectional view taken along line XI—XI of FIG. 9.

The shank 22 includes a small diameter portion 25 extending from a middle part thereof to an enlarged tip 16 provided in the lower most end of the shank 22. Four radial recesses 26 are provided in a lower part of the small diameter portion 25 at equal intervals along the circumferential direction, and each include a sloping surface 26a, which jointly defines a tapering contour coaxial with the central axial line of the shank 22. The upper end of each of the radial recesses 26 or the upper end of each of the sloping surfaces 26a is provided with an arcuate radial projection 27 (FIG. 11). The parts located between the radial projections 27 define a smooth cylindrical surface 28 which is smoothly connected to the sloping surfaces 26a and the upper part of the outer circumferential surface of the small diameter portion 25. The enlarged tip 16 is provided with a conical end surface 16a to facilitate the insertion of the pin part 2 into the grommet part 1 to combine them as illustrated in FIG. 2, and prevents the pin part 2 from being dislodged from the state illustrated in FIG. 2, by being engaged by the engagement projections 19.

Figure 2:
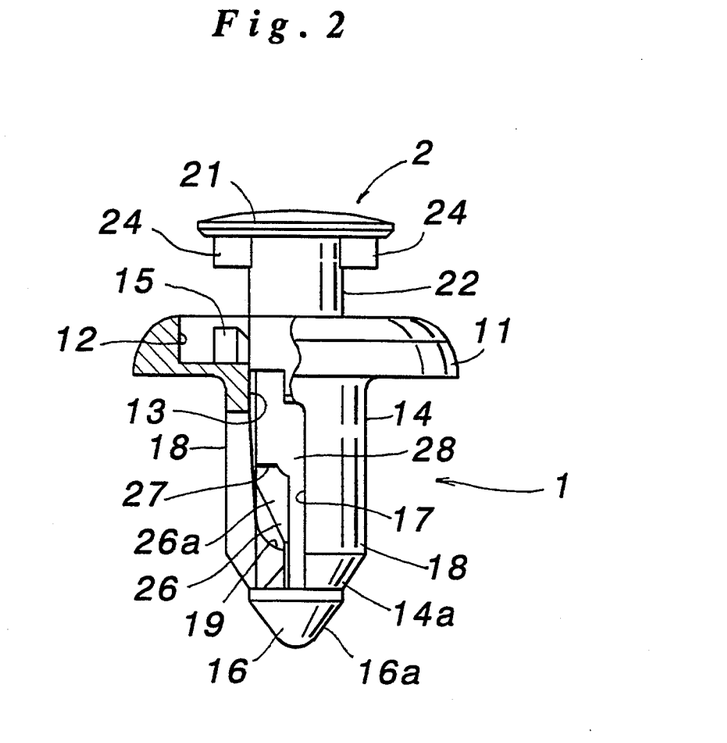
FIG. 2 is a front view of the push rivet in its unfastened state showing a part of it in section.

Referring to FIG. 2, in the initial state of this push rivet prior to the fastening process, the shank 22 of the pin part 2 is received in the central bore 13 of the grommet part 1, and the engagement projections 19 provided in the inner surfaces of the lower ends of the leg portion segments 18 are received in the corresponding recesses 26, thereby retaining the pin part 2 with the grommet part 1. The leg portion 14 is still not deformed, and presents a substantially cylindrical outer contour. Thus, the two parts of the push rivet can be safely kept together in this state during transportation and stocking. In this state, the head 21 of the pin part 2 and an upper part of the shank 22 project from the upper end of the flange 11 of the grommet part 1.

Figure 1:
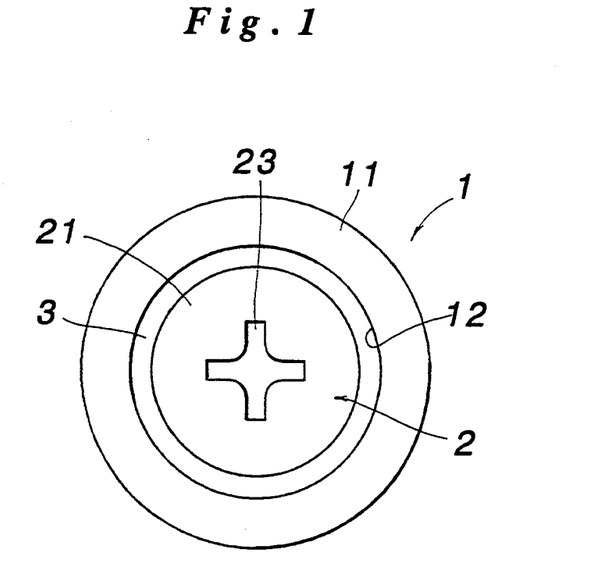
FIG. 1 is a plan view showing a first embodiment of the push rivet according to the present invention.
Figure 3:
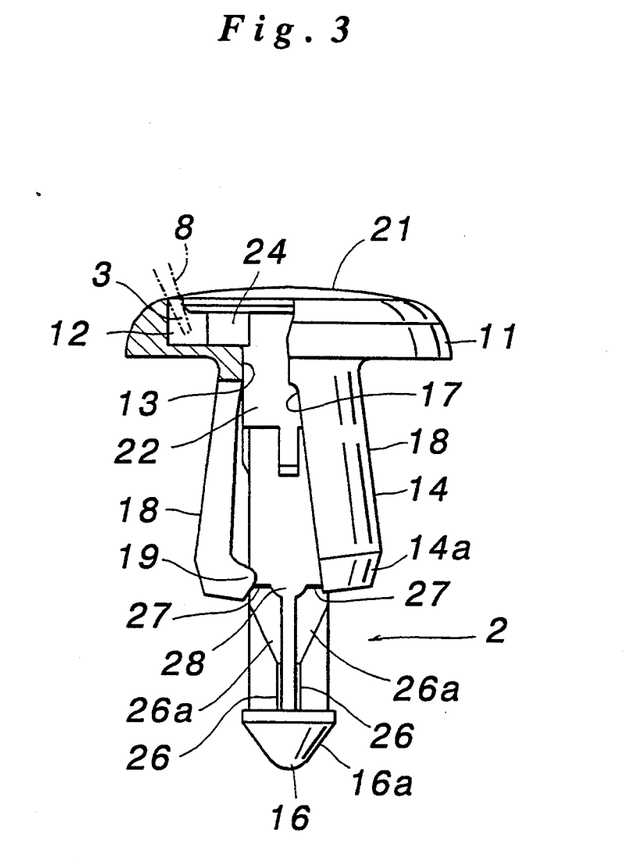
FIG. 3 is a view similar to FIG. 2 showing the push rivet in its fully fastened state.
Figure 4:
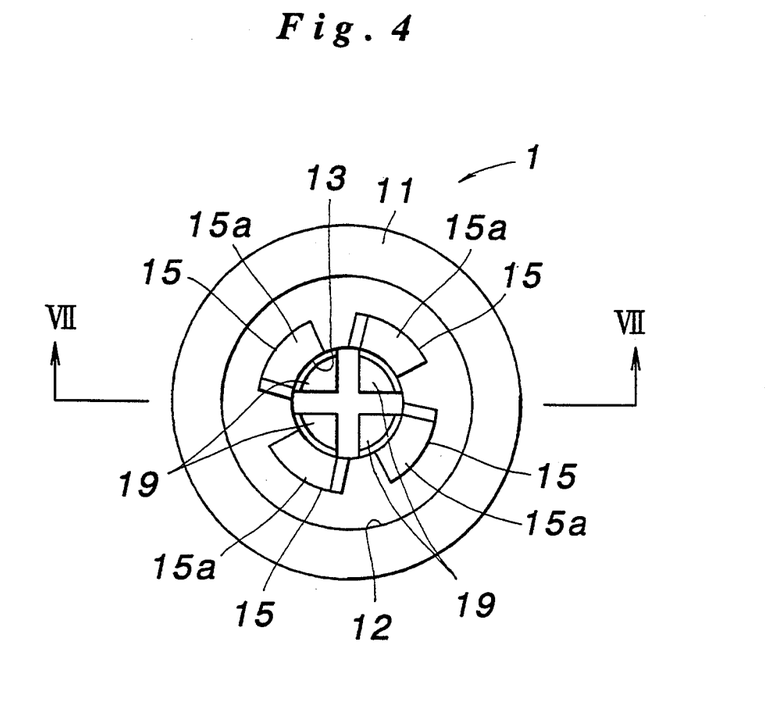
FIG. 4 is a plan view of the grommet part of the push rivet.
Figure 5:
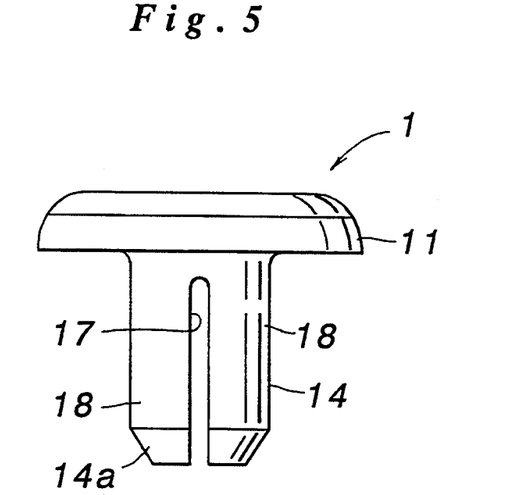
FIG. 5 is a front view of the grommet part.
Figure 6:
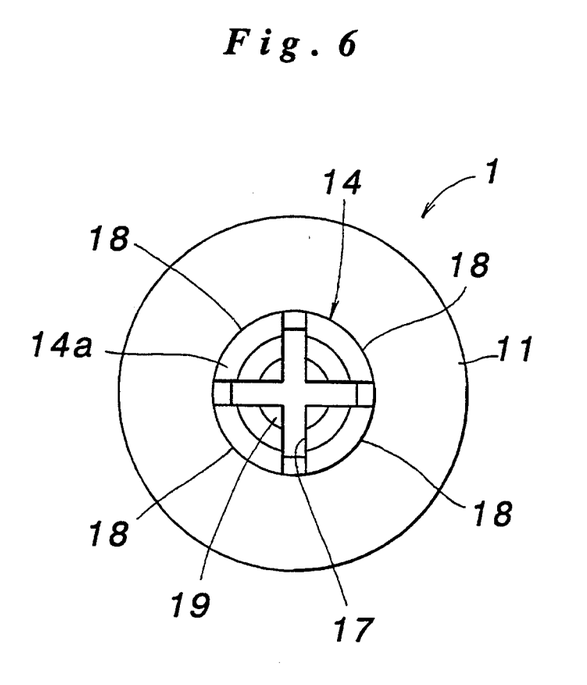
FIG. 6 is a bottom view of the grommet part.
Figure 7:
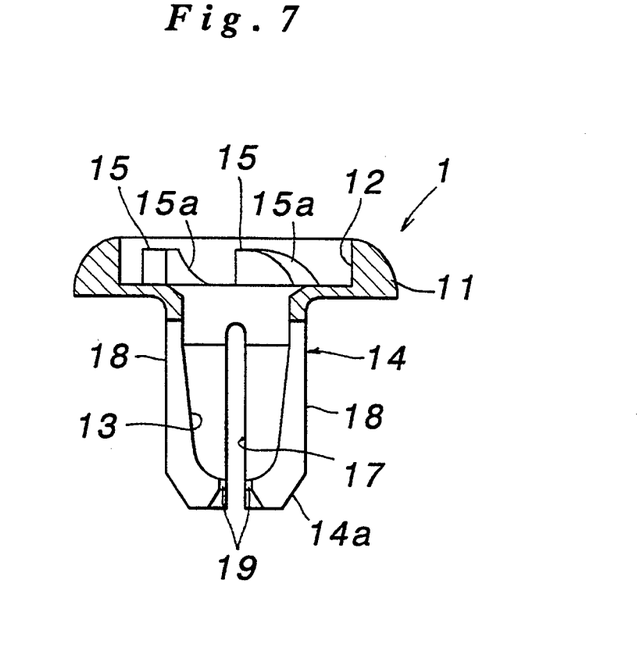
FIG. 7 is a sectional view taken along line VII—VII of FIG. 4.
Figure 8:
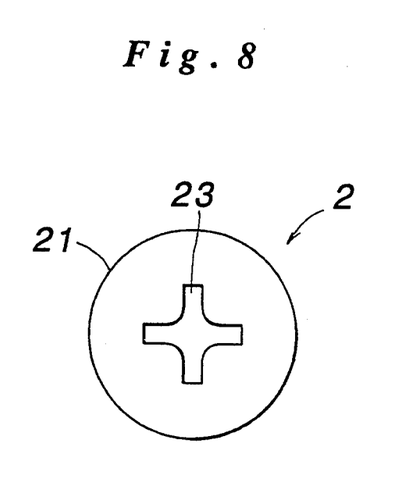
FIG. 8 is a plan view of the pin part.
Figure 9:
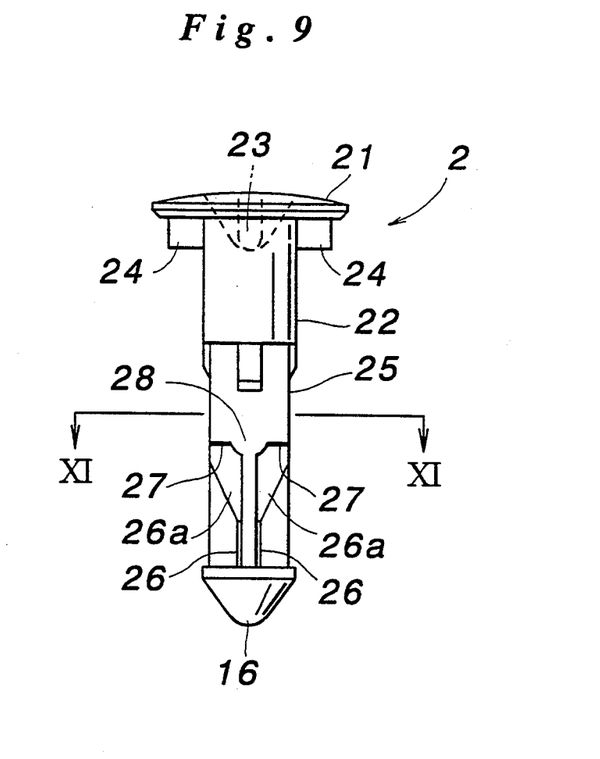
FIG. 9 is a front view of the pin part.

Now the manner of use of this push rivet is described in the following. By pushing the head 21 of the pin part 2 from the state illustrated in FIG. 2 into the central bore 13 of the grommet part 1, the shank 22 of the pin part 2 is forced into the central bore 13 of the grommet part 2 (or toward the projections 19). As a result, the projections 19 of the segments 18 are made to ride over the sloping surfaces 26a provided in the recesses 26 of the shank 22, thereby pushing the engagement projections 19 along with the segments 18 outwardly in radial direction. When the engagement projections 19 have ridden over the radial projections 27 provided in the upper ends of the sloping surfaces 26a, the lower ends of the axial projections 24 of the pin head 21 abut the bottom surface of the central recess 12 of the grommet part 1, and the pin head 21 is substantially entirely received in the central recess 12, thus presenting a smooth outer contour as illustrated in FIG. 3. As illustrated in FIGS. 1 and 3, the head 21 of the pin part 2 has an outer diameter slightly smaller than the inner diameter of the central recess 12 so that an annular gap 3 is defined between the outer circumference of the pin head 21 and the central recess 12 of the grommet part 1.

When the pin head 21 is turned by fitting the cross-shaped tip of a screwdriver into the complementary cross-shaped recess 23 (refer to FIG. 1) provided in the pin head 21, and turning this screwdriver, the pin shank 22 is made to turn inside the central bore 13 of the grommet part 1, and the axial projections 19 ride over the sloping surfaces 15a of the ramps 15 provided on the bottom surface of the central recess 12 while the engagement projections 19 of the leg portion segments 18 move over to the smooth surfaces 28 from above the radial projections 27. As the axial projections 19 ride over the sloping surfaces 15a, the pin shank 22 is pulled upward, and the engagement projections 19 slide over the smooth surfaces 28 of the pin shank 22 along helical paths until they drop into the adjacent engagement recesses 26 of the pin shank 22.

Thus, the expanded state of the leg portion 14 is resolved, and the initial condition illustrated in FIG. 2 is restored. This unfastening process can be completed simply by turning the pin head 22 by a certain angle. More specifically, when the pin head 22 is turned, the pin part 2 is pushed upward initially by virtue of the interaction between the axial projections 19 and the sloping surfaces 15a, and then by virtue of the interaction between the engagement projections 19 of the leg portion segments 18 and the sloping surfaces 16a combined by the elastic restoring force of the leg portion segments 18.

Figure 12:
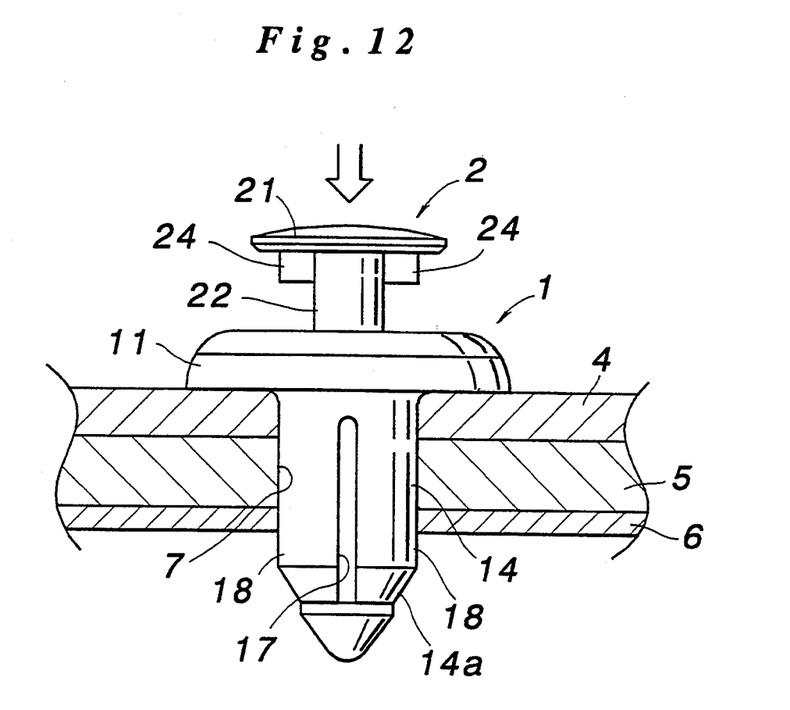
FIG. 12 is a side view showing the push rivet fitted into a mounting hole of panel members before the push rivet is fastened.

This push rivet is typically used for connecting two panel members, or plate members of two component parts with each other. Referring to FIG. 12, panel members 4, 5 and 6 which are to be joined together are placed one over the other with their openings aligned with each other so as to define a mounting hole 7. The leg portion 14 of the grommet part 1 is fitted into this hole 7 until the lower surface of the flange 11 abuts the upper most panel member 4. Then, the pin head 21 is pushed down by using a finger or the like, and the pin shank 22 is forced into the central bore 13 of the leg portion 14.

Figure 13:
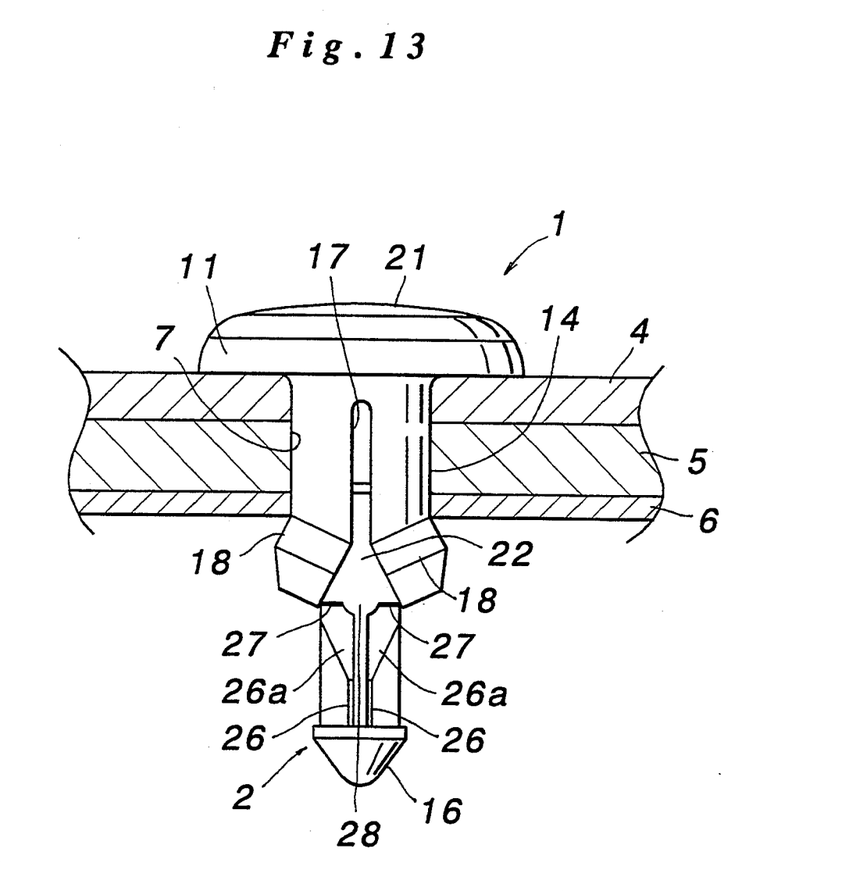
FIG. 13 is a side view showing the push rivet fitted into a mounting hole of panel members after the push rivet is fastened.

As a result, the free end of the leg portion 14 is expanded radially as previously described with reference to FIG. 3. Because the base end of the leg portion 14 is located inside the mounting hole 7, only the free end of the leg portion 14 passed through the mounting hole 7 is expanded, and this causes the biased end of the leg portion 14 inside the mounting hole 7 To be pushed radially against the periphery of the mounting hole 7, and the free end of the leg portion 14 to be pushed upward against the periphery of the mounting hole 7 as illustrated in FIG. 13. Thus, the panels 4, 5 and 6 are securely interposed between the lower surface of the flange 11 and the expanded free end of the leg portion 14.

In this case, since the pin part 2 is received inside the grommet part 1 from the beginning, the push rivet can be fastened so as to secure the panels with one another simply by fitting the leg portion 14 into the mounting hole 7, and pushing the pin head 21 protruding from the upper end of the grommet part 1. Furthermore, since the leg portion 14 is divided into four segments 18 by the slits 17, the leg portion 14 can readily expand radially as the pin shank 22 is forced into the central bore 13. Therefore, the free end of the leg portion 14 can expand uniformly over its entire circumference, and the push rivet can therefore securely join the panels 4, 5 and 6 together against forces of any directions.

When desired, this push rivet can be readily unfastened by turning the pin head 21 with a screwdriver having a .cross-shaped tip, and resolving the expanded state of the leg portion 14. Furthermore, because the push rivet regains its initial condition when unfastened, it can be readily fastened again for repeated use.

In some cases, when an attempt is made to unfasten the push rivet by turning the pin head 21, the grommet part 1 may also turn with the pin head 21, thereby preventing the pin part 2 to be pulled upward, and the push rivet to be unfastened. However, according to the present invention, even in such a case, because there is an annular gap 3 between the outer periphery of the pin head 21 and the inner periphery of the central recess 12, the push rivet can be readily unfastened by forcing a tip of a tool such as a screwdriver having a "-" tip into the gap 3, and lifting the pin head 21 by using the screwdriver as a lever. When the pin part 2 is pulled upward in this fashion, the engagement projections 19 of the leg portion segments 18 can ride over the radial projections 27 of the pin shank 22, and drop into the corresponding recesses 26 so as to resolve the expanded state of the leg portion 18.

Thus, the push rivet of the present invention can be readily fastened simply by pushing the pin head 21, and can be equally readily unfastened by turning the pin head 21. When the push rivet cannot be unfastened by turning the pin head 21 because the grommet part 1 is also turned with the pin part 2, it can be then unfastened by lifting the pin head 21 by fitting a tip of a tool into the gap 3, and using the tool as a lever.

Although the present invention has been described in terms of a preferred embodiment thereof, it is obvious to a person skilled in the art that various alterations and modifications are possible without departing from the scope of the present invention which is set forth in the appended claims. For instance, the pin part 2 is received in the grommet part 1 in the initial condition of the push rivet, according to the above described embodiment, so that it can be readily fastened by pushing the pin head, but the pin part 2 may also be separately stocked so that only the grommet part 1 is first fitted into a mounting hole, and a pin part 2 provided separately from the grommet part 1 is then inserted in the central bore of the grommet part. Also, the mechanism for unfastening the push rivet by turning the pin head, in this case, consisting of the axial projections 19, the sloping surfaces 15a and the cross-shaped recess 23 on top of the pin head 21, may be omitted if desired so that the unfastening of the push rivet can be accomplished only by fitting a narrow tip of a tool into the annular gap, and lifting the pin head by using this tool.

Figure 14:
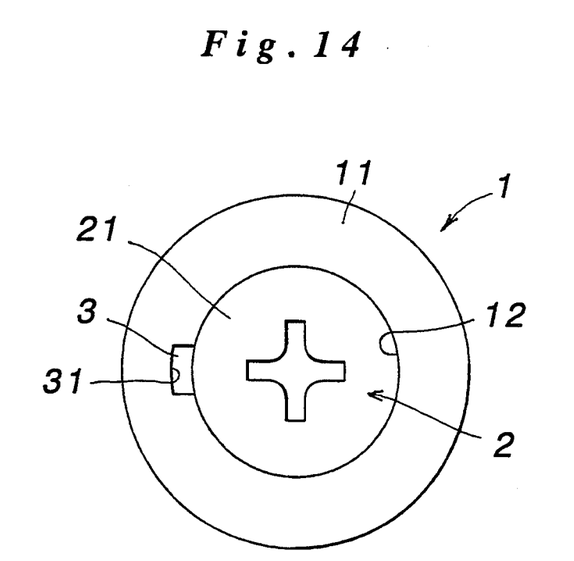
FIG. 14 is a view similar to FIG. 1 showing a second embodiment of the present invention.
Figure 15:
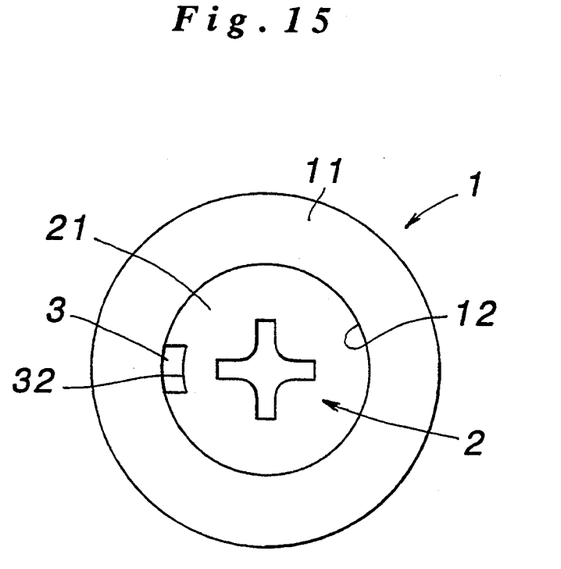
FIG. 15 is a view similar to FIG. 1 showing a third embodiment of the present invention.

In the above described embodiment, the annular gap 3 was defined by selecting the outer diameter of the pin head 21 to be slightly smaller than the inner diameter of the central recess 12. However, a gap for inserting a tip of a tool can be defined in other ways. For instance, as illustrated in FIG. 14, it is also possible to form a notch 31 in the inner periphery of the central recess 12 so that a gap 3 may be defined between the notch 31 and the outer periphery of the pin head 21. Alternatively, as illustrated in FIG. 15, it is also possible to provide a notch 32 in the outer periphery of the pin head 21 so that a gap 3 may be defined between the inner periphery of the central recess 12 and the notch 32.

Thus, according to the present invention, the unfastening of the push rivet is extremely simplified without complicating the structure thereof. Because the unfastening can be accomplished by pushing a pointed end of a tool into the gap provided around the pin head, and pulling the pin part preferably by using this tool as a lever, the push rivet can be readily unfastened even when it is placed in a poorly accessible location. Furthermore, because the unfastening of the push rivet would not damage or otherwise affect the condition of the push rivet, it can be used over and over again.

What we claim is:

1. A push rivet consisting of a grommet part, and a pin part;
    said grommet part including a hollow leg portion defining an axial central bore, said hollow leg portion being flexible so as to be elastically expanded radially, and a flange extending radially from an upper end of said leg portion, a central recess communicating with said central bore being defined on an upper end of said flange;
    said pin part including a pin shank adapted to be passed into said central bore, and an enlarged pin head formed at a base end of said pin shank, said pin shank being provided with engagement means at a free end thereof adapted to cooperate with an associated free end of said leg portion of said grommet part to expand said free end of said leg portion of said grommet part as said pin shank is forced into said central bore;

said pin head being provided with an outer profile which conforms to a profile of a part of said flange surrounding said pin head when said pin part is completely forced into said central bore;

a gap being defined between an outer periphery of said pin head and an associated inner periphery of said central recess for allowing a tip of a tool to be fitted into said gap, Said gap being in the form of a notch in said central recess.

2. A push rivet consisting of a grommet part, and a pin part;

said grommet part including a hollow leg portion defining an axial central bore, said hollow leg portion being flexible so as to be elastically expanded radially, and a flange extending radially from an upper end of said leg portion, a central recess communicating with said central bore being defined on an upper end of said flange;

said pin part including a pin shank adapted to be passed into said central bore, and an enlarged pin head formed at a base end of said pin shank, said pin shank being provided with engagement means at a free end thereof adapted to cooperate with an associated free end of said leg portion of said grommet part to expand said free end of said leg portion of said grommet part as said pin shank is forced into said central bore;

said pin head being provided with an outer profile which conforms to an outer profile of a part of said flange surrounding said pin head when said pin part is completely forced into said central bore;

a gap being defined between an outer periphery of said pin head and an associated inner periphery of said central recess for allowing a tip of a tool to be fitted into said gap; and wherein said pin head is provided with an outer diameter substantially smaller than an inner diameter of said central recess so that said gap is defined as an annular gap defined therebetween.

3. A push rivet according to claim 2, wherein said central recess consists of a circular recess coaxial with said leg portion, and said pin head has a circular outer periphery which is coaxial with said circular recess.

4. A push rivet consisting of a grommet part, and a pin part;

said grommet part including a hollow leg portion defining an axial central bore, said hollow leg portion being flexible so as to be elastically expanded radially, and a flange extending radially from an upper end of said leg portion, a central recess communicating with said central bore being defined on an upper end of said flange;

said pin part including a pin shank adapted to be passed into said central bore, and an enlarged pin head formed at a base end of said pin shank, said pin shank being provided with engagement means at a free end thereof adapted to cooperate with an associated free end of said leg portion of said grommet part to expand said free end of said leg portion of said grommet part as said pin shank is forced into said central bore;

said pin head being provided with an outer profile which conforms to an outer profile of a part of said flange surrounding said pin head when said pin, art is completely forced into said central bore;

a gap being defined between an outer periphery of said pin head and an associated inner periphery of said central recess for allowing a tip of a tool to be fitted into said gap; and wherein said pin head is provided with a notch on an outer periphery thereof, and said gap is defined between said notch and an associated part of said inner periphery of said central recess.

5. A push rivet consisting of a grommet part, and a pin part;

said grommet part including a hollow leg portion defining an axial central bore, said hollow leg portion being flexible so as to be elastically expanded radially, and a flange extending radially from an upper end of said leg portion, a central recess communicating with said central bore being defined on an upper end of said flange;

said pin part including a pin shank adapted to be passed into said central bore, and an enlarged pin head formed at a base end of said pin shank, said pin shank being provided with engagement means at a free end thereof adapted to cooperate with an associated free end of said leg portion of said grommet part to expand said free end of said leg portion of said grommet part as said pin shank is forced into said central bore;

said pin head being provided with an outer profile which conforms to an outer profile of a part of said flange surrounding said pin head when said pin part is completely forced into said central bore;

a gap being defined between an outer periphery of said pin head and an associated inner periphery of said central recess for allowing a tip of a tool to be fitted into said gap; and wherein said central recess is provided with a notch on said inner periphery thereof, and said gap is defined between said notch and an associated part of said outer periphery of said pin head.

* * * * *